(12) United States Patent
Lai et al.

(10) Patent No.: US 8,493,753 B2
(45) Date of Patent: Jul. 23, 2013

(54) PHOTOVOLTAIC POWERED SYSTEM

(75) Inventors: Ching-Ming Lai, Taipei (TW);
Ching-Tsai Pan, Taipei (TW);
Chih-Hsing Fang, Taipei (TW);
Wen-Wei Chan, Taipei (TW);
Ming-Chieh Cheng, Taipei (TW)

(73) Assignee: Allis Electric Co., Ltd., Taipei (TW)

( * ) Notice: Subject to any disclaimer, the term of this patent is extended or adjusted under 35 U.S.C. 154(b) by 233 days.

(21) Appl. No.: 13/041,585

(22) Filed: Mar. 7, 2011

(65) Prior Publication Data
US 2012/0230066 A1 Sep. 13, 2012

(51) Int. Cl.
*H02M 5/45* (2006.01)
(52) U.S. Cl.
USPC .................................. 363/37; 363/35; 363/39
(58) Field of Classification Search
USPC . 363/22–26, 34, 35, 37, 39–41, 56.06–56.09, 363/131
See application file for complete search history.

(56) References Cited

U.S. PATENT DOCUMENTS

| 8,009,448 | B2* | 8/2011 | Liu | 363/56.12 |
| 2003/0218892 | A1* | 11/2003 | Nakagawa | 363/56.12 |
| 2004/0264215 | A1* | 12/2004 | Ambo et al. | 363/17 |
| 2008/0043494 | A1* | 2/2008 | Jiao et al. | 363/16 |
| 2011/0026282 | A1* | 2/2011 | Chapman et al. | 363/65 |
| 2012/0087159 | A1* | 4/2012 | Chapman et al. | 363/41 |

* cited by examiner

*Primary Examiner* — Adolf Berhane
*Assistant Examiner* — Yemane Mehari
(74) *Attorney, Agent, or Firm* — Chun-Ming Shih; HDLS IPR Services (57) ABSTRACT

A photovoltaic powered system and an alternating current (AC) module thereof are disclosed. The photovoltaic powered system provides a direct current (DC) power through a photovoltaic module and converts the DC power into an AC power, which is grid-connected to an AC utility power. The AC module of the photovoltaic powered system produces a continuous quasi-sinusoidal current and the quasi-sinusoidal current is converted into a sinusoidal current. The high-frequency harmonic components of the sinusoidal current are filtered to produce a sinusoidal output current in phase with the AC utility power, thus realizing the maximum power point tracking (MPPT) of the photovoltaic module and feeding unity-power-factor power into the AC utility power.

19 Claims, 7 Drawing Sheets

PHOTOVOLTAIC POWERED SYSTEM

BACKGROUND OF THE INVENTION

1. Field of the Invention

The present invention relates to a photovoltaic powered system, and more particularly to a grid-connected photovoltaic powered system.

2. Description of Prior Art

Because the solar energy has the pollution-free and public harm-free characteristics and is further inexhaustible in supply and always available for use, the solar energy has high potential applications and developments. Recently with the rapidly development of the high-efficiency solar cells, this topic has been gradually promoted by making policies in many developed countries, such as Europe countries, the United States, Japan, and so on.

The solar photovoltaic system provides a photovoltaic conversion to generate a DC power through the solar cell panels. Afterward, the DC power is converted into an AC power through a power conditioner to supply to loads or the converted AC power is grid-connected to an AC utility power through the utility grid bus. The solar photovoltaic system can be broadly divided into three categories: (1) stand-alone system, (2) grid-connection system, and (3) hybrid system.

The stand-alone system means that the solar photovoltaic system is completely operational without requiring external support and only directly supply to loads. Hence, the stand-alone system is generally built in remote areas or isolated islands. In particular, the required power electricity of loads is either the wind power or the solar power. The solar power or/and the wind power can further provide redundant power to charge the standby battery, whereas the loads can be supplied through the battery when the solar power or/and the wind power is insufficient. The grid-connection system means that the solar photovoltaic system is further connected to the power grid of the electric power company. Hence, the grid-connection system is suitable for where the utility power can reach. When the amount of electricity generation of the solar photovoltaic system is greater than that of load demands, the redundant power remains would be delivered to the utility grid bus. On the other hand, the utility power can provide the required power electricity to loads when the amount of electricity generation of the solar photovoltaic system is insufficient. Furthermore, in order to improve the power supply reliability and quality, the hybrid system is developed. The solar photovoltaic system, which is combined with standby batteries, is temporarily separated from the utility power to provide power electricity to loads when the utility power fails. The solar photovoltaic system is further grid-connected to the utility grid bus until the utility power is available.

Figure 1A:
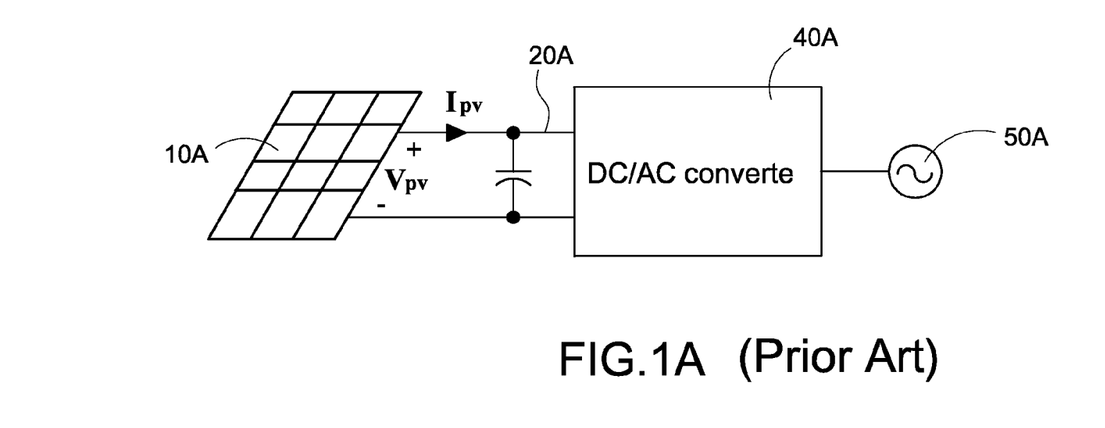
FIG. 1A is a block diagram of a prior art single-stage grid-connected photovoltaic system.
Figure 1B:
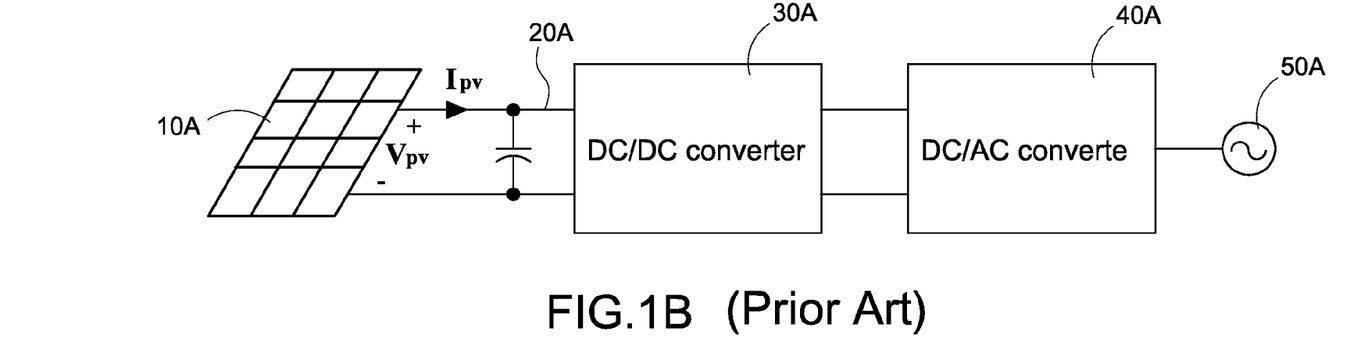
FIG. 1B is a block diagram of a prior art two-stage grid-connected photovoltaic system.

The grid-connected solar photovoltaic system can be divided into two categories: single-stage structure and two-stage structure. Reference is made to FIG. 1A and FIG. 1B which are a block diagram of a prior art single-stage and a prior art two-stage grid-connected photovoltaic system, respectively. As shown in FIG. 1A, the photovoltaic system is grid connected to an AC utility power 50A. The photovoltaic system includes a photovoltaic module 10A, an input filter capacitor 20A, and a DC/AC converter 40A. The photovoltaic module 10A converts light energy into electric energy to provide a DC output voltage Vpv and a DC output current Ipv. The input filter capacitor 20A is electrically connected to the photovoltaic module 10A to provide functions of energy-storing, energy-releasing, and filtering for rear-end circuits. The DC/AC converter 40A is electrically connected to the input filter capacitor 20A, and the power switches of the DC/AC converter 40A can be driven through a sinusoidal pulse-width-modulation (SPWM) technology, thus converting the DC power into the amplitude-modulated and frequency-modulated sinusoidal AC power. Hence, the modulated sinusoidal AC power can be grid-connected to the AC utility power 50A through the utility grid bus. Because the single-stage grid-connected photovoltaic system has the advantages, such as simple circuit structure, easy control, and high efficiency, it is suitable for the large power photovoltaic module with a high output voltage. Because the photovoltaic module 10A is directly connected to the high-voltage DC bus of the DC/AC converter 40A, the single-stage grid-connected photovoltaic system is not suitable for the small power photovoltaic module due to the inelastic arrays of the photovoltaic module 10A and low-reliable in-series batteries.

As shown in FIG. 1B, a major difference between the single-stage structure and the two-stage structure is that the two-stage grid-connected photovoltaic system further has a DC/DC converter 30A. The DC/DC converter 30A is electrically connected to the input filter capacitor 20A to receive the filtered DC voltage outputted from the input filter capacitor 20A and boost the voltage level of the filtered DC voltage. The operation of the rear-end circuits of the two-stage structure is identical to that of the single-stage structure, hence, the detail (description) is omitted here for conciseness. Because many in-series photovoltaic modules 10A are not required in the two-stage grid-connected photovoltaic system, it could reduce volume and costs and increase elasticity and reliability of the array connection of the photovoltaic module 10A. However, the two-stage structure and the high-frequency switching would reduce efficiency of the photovoltaic system.

The above-mentioned conventional signal-stage or two-stage grid-connected photovoltaic system generally uses the DC/AC converter 40A with a high-frequency switching operation. In particular, the output amplitude, frequency, and phase of the photovoltaic system have to the same with those of the AC utility power 50A. In addition, a phase-locked-loop (PLL) is used to provide a synchronous operation for the DC/AC converter 40A to connect to the AC utility power 50A. Furthermore, a good current-controlling operation is necessary to prevent damaging the converters from circulating current when the photovoltaic system grid-connecting to the AC utility power 50A. In addition, the major disadvantages of the DC/AC converter 40A are the poor self current-limiting and poor current-controlling, thus easily occurring transient over-current damage.

Accordingly, it is desirable to provide a photovoltaic powered system to overcome disadvantages of the DC/AC converter 40A and increase whole conversion efficiency, thus increasing the utilization rate of the photovoltaic powered system.

SUMMARY OF THE INVENTION

In order to achieve the above-mentioned objectives, a photovoltaic powered system is disclosed. The photovoltaic powered system provides a direct current (DC) power through a photovoltaic module and converts the DC power into an alternating current (AC) power, which is grid-connected to an AC utility power. The photovoltaic powered system includes the photovoltaic module, a coupling capacitance unit, and an AC module.

The coupling capacitance unit is electrically connected to the photovoltaic module to filter the DC power outputted from the photovoltaic module.

The AC module is electrically connected to the coupling capacitance unit to convert the filtered DC power into a quasi-sinusoidal current. The AC module includes an active-clamping circuit, a power converter, and an AC selection switch circuit.

The active-clamping circuit has a first clamping switch, a second clamping switch, a first clamping capacitor, and a second clamping capacitor, which receives the filtered DC power and reduces voltage spike of the filtered DC power. The power converter is electrically connected to the active-clamping circuit and has an isolated transformer. The isolated transformer has a first main switch and a second main switch at a primary side thereof and has two diodes and two filter capacitors (forming a rectifying circuit) at a secondary side thereof, thus receiving the DC power, converting the voltage level of the DC power, and rectifying the DC power. The AC selection switch circuit is electrically connected to the power converter and the AC utility power and has a plurality of power switches forming a full-bridge switch circuit to provide a synchronous switching to the AC utility power.

Therefore, the quasi-sinusoidal current is converted into a sinusoidal current and high-frequency harmonic components of the sinusoidal current are filtered to produce a sinusoidal output current in phase with the AC utility power, thus realizing the maximum power point tracking (MPPT) of the photovoltaic module and feeding unity-power-factor power into the AC utility power.

In order to achieve the above-mentioned objectives, an alternating current (AC) module of a photovoltaic powered system is disclosed. The AC module of the photovoltaic powered system receives a direct current (DC) power and converts the DC power into an AC power, which is grid-connected to an AC utility power. The AC module includes an active-clamping circuit, a power converter, and an AC selection switch circuit.

The active-clamping circuit has a first clamping switch, a second clamping switch, a first clamping capacitor, and a second clamping capacitor, which receives the filtered DC power to reduce voltage spike of the filtered DC power. The power converter is electrically connected to the active-clamping circuit and has an isolated transformer. The isolated transformer has a first main switch and a second main switch at a primary side thereof and having two diodes and two filter capacitors (forming a rectifying circuit) at a secondary side thereof, thus receiving the DC power, converting the voltage level of the DC power, and rectifying the DC power. The AC selection switch circuit is electrically connected to the power converter and the AC utility power and has a plurality of power switches forming a full-bridge switch circuit to provide a synchronous switching to the AC utility power.

Therefore, the quasi-sinusoidal current is converted into a sinusoidal current and high-frequency harmonic components of the sinusoidal current are filtered to produce a sinusoidal output current in phase with the AC utility power, thus realizing the maximum power point tracking (MPPT) of the photovoltaic module and feeding unity-power-factor power into the AC utility power.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Reference will now be made to the drawing figures to describe the present invention in detail.

Figure 2:
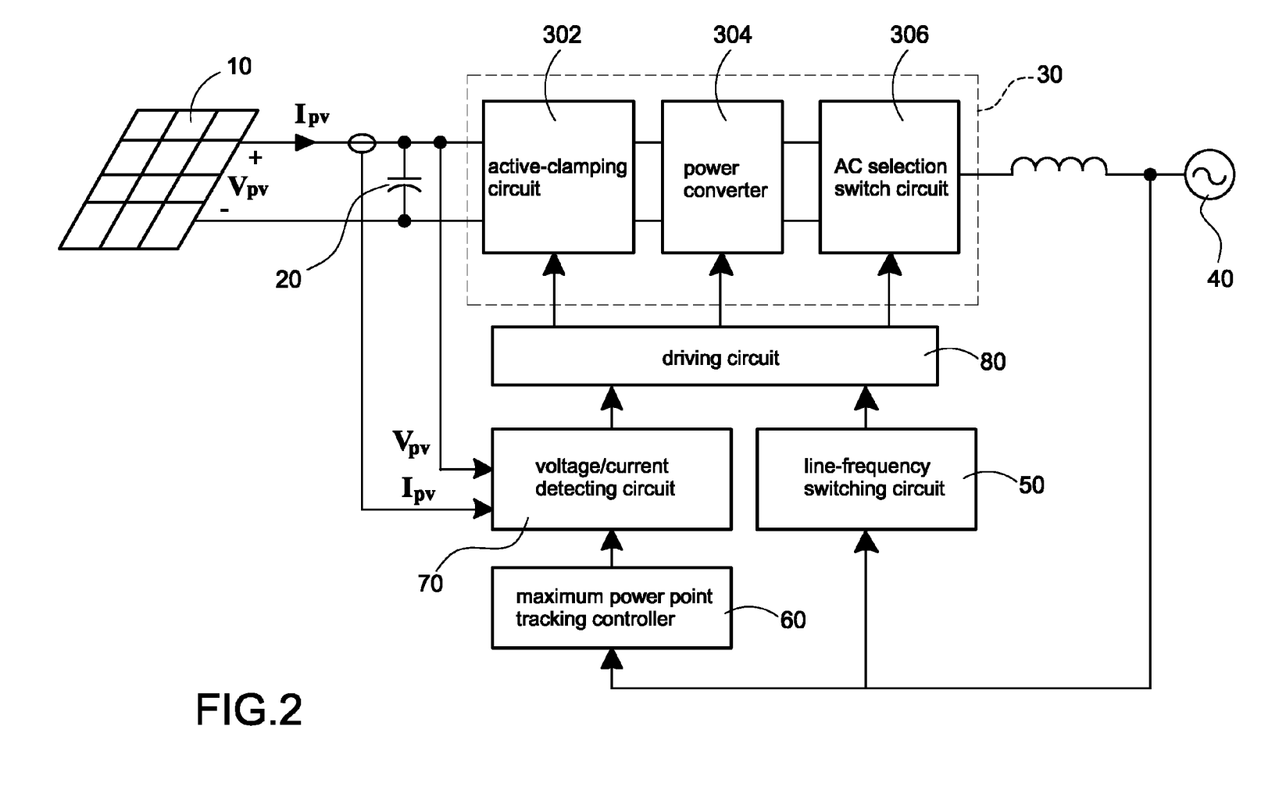
FIG. 2 is a block diagram of a photovoltaic powered system according to the present invention.

Reference is made to FIG. 2 which is a block diagram of a photovoltaic powered system according to the present invention. The photovoltaic powered system provides a direct current (DC) power (including a DC output voltage Vpv and a DC output current Ipv) through a photovoltaic module 10 and converts the DC power into an alternating current (AC) power, which is grid-connected to an AC utility power 40. The photovoltaic powered system includes the photovoltaic module 10, a coupling capacitance unit 20, and an AC module 30.

The coupling capacitance unit 20 is electrically connected to the photovoltaic module 10 to filter the DC power outputted from the photovoltaic module 10. The AC module 30 is electrically connected to the coupling capacitance unit 20 to convert the filtered DC power into a quasi-sinusoidal current through a continuous conduction mode (CCM). The AC module 30 includes an active-clamping circuit 302, a power converter 304, and an AC selection switch circuit 306.

The photovoltaic powered system further includes a line-frequency switching circuit 50, a maximum power point tracking controller 60, a voltage/current detecting circuit 70, and a driving circuit 80. The line-frequency switching circuit 50 is electrically connected to the AC module 30 to receive the voltage and current outputted from the AC module 30, thus producing driving signals for driving the power switches of the AC selection switch circuit 306. The voltage/current detecting circuit 70 is electrically connected to the photovoltaic module 10 and the coupling capacitance unit 20 to detect the DC output voltage Vpv and the DC output current Ipv outputted from the photovoltaic module 10 and produce driving signals for driving the first clamping switch 3022 and the second clamping switch 3024 of the active-clamping circuit 302 and the first main switch 3042 and the second main switch 3044 of the power converter 304. The maximum power point tracking controller 60 is electrically connected to the AC module 30 and the voltage/current detecting circuit 70 to control the voltage/current detecting circuit 70 by feeding back the output power of the AC module 30 and adjust the voltage and current operation points of the photovoltaic module 10 to realize the MPPT. The driving circuit 80 is electrically connected to the voltage/current detecting circuit 70, the line-frequency switching circuit 50, and the AC module 30 to receive the driving signals produced from the voltage/current detecting circuit 70 and the line-frequency switching circuit 50, respectively, and to drive the active-clamping circuit 302 and the AC selection switch circuit 306 of the AC module 30.

Figure 3:
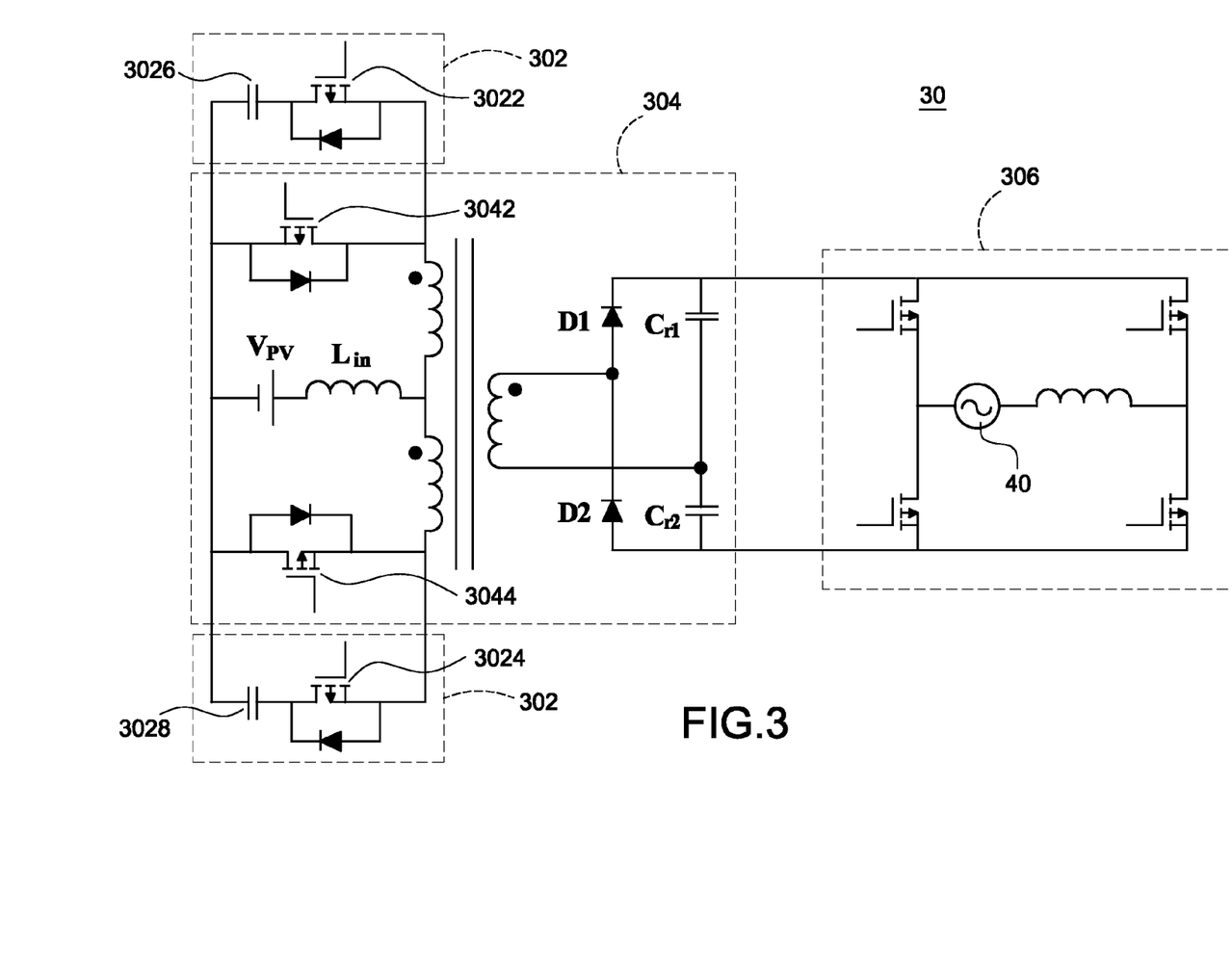
FIG. 3 is a circuit diagram of an active-clamping circuit of an AC module according to a first embodiment of the present invention.

Reference is made to FIG. 3 which is a circuit diagram of an active-clamping circuit of an AC module according to a first embodiment of the present invention. As above-mentioned description, the AC module 30 includes an active-clamping circuit 302, a power converter 304, and an AC selection switch circuit 306. As shown in FIG. 3, the active-clamping circuit 302 includes a first clamping switch 3022, a second clamping switch 3024, a first clamping capacitor 3026, and a second clamping capacitor 3028. The active-clamping circuit 302 receives the filtered DC power and reduces voltage spike of the filtered DC power. In particular, the first clamping switch 3022 and the second clamping switch 3024 has an anti-parallel diode, also called body diode (not labeled), and a parasitic capacitance (not shown), respectively. The power converter 304 is electrically connected to the active-clamping circuit 302 and has an isolated transformer (not labeled). The isolated transformer has a first main switch 3042 and a second main switch 3044 at a primary side (not labeled) thereof and has two diodes D1, D2 and two filter capacitors Cr1, Cr2 (forming a rectifying circuit) at a secondary side (not labeled) thereof, thus receiving the DC power, converting the voltage level of the DC power, and rectifying the DC power.

The power converter 304 is a current-fed push-pull converter. The isolated transformer of the power converter 304 has a primary side with a center tap and a secondary side with a voltage-doubling rectifying to boost the voltage level of the output voltage of the photovoltaic module 10 to coordinate that of the AC utility power, thus providing a current-fed grid-connection to the AC utility power 40. In particular, the first clamping switch 3022 of the active-clamping circuit 302 and the first main switch 3042 of the power converter 304 are driven by complementary-level driving signals. Similarly, the second clamping switch 3024 of the active-clamping circuit 302 and the second main switch 3044 of the power converter 304 are driven by complementary-level driving signals. In addition, the phase difference between the first main switch 3042 and the second main switch 3044 of the power converter 304 is 180 degrees. In addition, a dead time is inserted when the first clamping switch 3022 of the active-clamping circuit 302 and the first main switch 3042 of the power converter 304 implement the soft-switching operation. Similarly, a dead time is inserted when the second clamping switch 3024 of the active-clamping circuit 302 and the second main switch 3044 of the power converter 304 implement the soft-switching operation.

The AC selection switch circuit 306 is electrically connected to the power converter 304 and the AC utility power 40 and has a plurality of power switches forming a full-bridge switch circuit (not labeled), thus providing a synchronous switching to the AC utility power. Therefore, by converting the quasi-sinusoidal current into a sinusoidal current and filtering high-frequency harmonic components of the sinusoidal current to produce a sinusoidal output current in phase with the AC utility power 40, thus realizing the maximum power point tracking (MPPT) of the photovoltaic module 10 and feeding unity-power-factor power into the AC utility power 40. In particular, the power switches of the AC selection switch circuit 306 are metal-oxide-semiconductor field effect transistors, MOSFETs.

The detailed operation of the AC module 30 is described as follows. As shown in FIG. 3, the AC module 30 with a soft-switching current-fed push-pull converter is disclosed. The isolated transformer has a low-voltage side (the primary side) and a high-voltage side (the secondary side). The low-voltage side has the first main switch 3042, the second main switch 3044 of the power converter 304 and the first clamping switch 3022, the second clamping switch 3024, the first clamping capacitor 3026, and the second clamping capacitor 3028 of the active-clamping circuit 302. In particular, the first clamping switch 3022 of the active-clamping circuit 302 and the first main switch 3042 of the power converter 304 are driven by complementary-level driving signals, and the second clamping switch 3024 of the active-clamping circuit 302 and the second main switch 3044 of the power converter 304 are driven the complementary-level driving signals. In addition, the phase difference between the first main switch 3042 and the second main switch 3044 of the power converter 304 is 180 degrees. The anti-parallel diodes, the parasitic capacitances of the first clamping switch 3022 and the second clamping switch 3024, and the primary-side leakage inductance (not shown) of the isolate transformer are used to provide sufficient inductive energy, thus normally achieving the zero-voltage-switching operation.

In particular, the power converter 304 has to produce the quasi-sinusoidal current because the AC selection switch circuit 306 is used to only provide a low-frequency switching operation without controlling current ability. In order to consider that the quasi-sinusoidal current and the high step-up ratio, an input inductor Lin is electrically connected in series to the input terminal of the photovoltaic powered system to realize a CCM current-converting operation through the first clamping switch 3022, the second clamping switch 3024, the first main switch 3042, and the second main switch 3044 in the low-voltage side of the isolated transformer. The isolated transformer has the primary side with a center tap and the secondary side with a voltage-doubling rectifying to boost the voltage level of the output voltage of the photovoltaic module 10 to coordinate that of the AC utility power 40, thus providing a current-fed grid-connection to the AC utility power 40. The AC module 30 of the photovoltaic powered system produces a continuous quasi-sinusoidal current and the quasi-sinusoidal current is converted into a sinusoidal current. The high-frequency harmonic components of the sinusoidal current are filtered to produce a sinusoidal output current in phase with the AC utility power 40, thus realizing the maximum power point tracking (MPPT) of the photovoltaic module 10 and feeding unity-power-factor power into the AC utility power 40.

Figure 4:
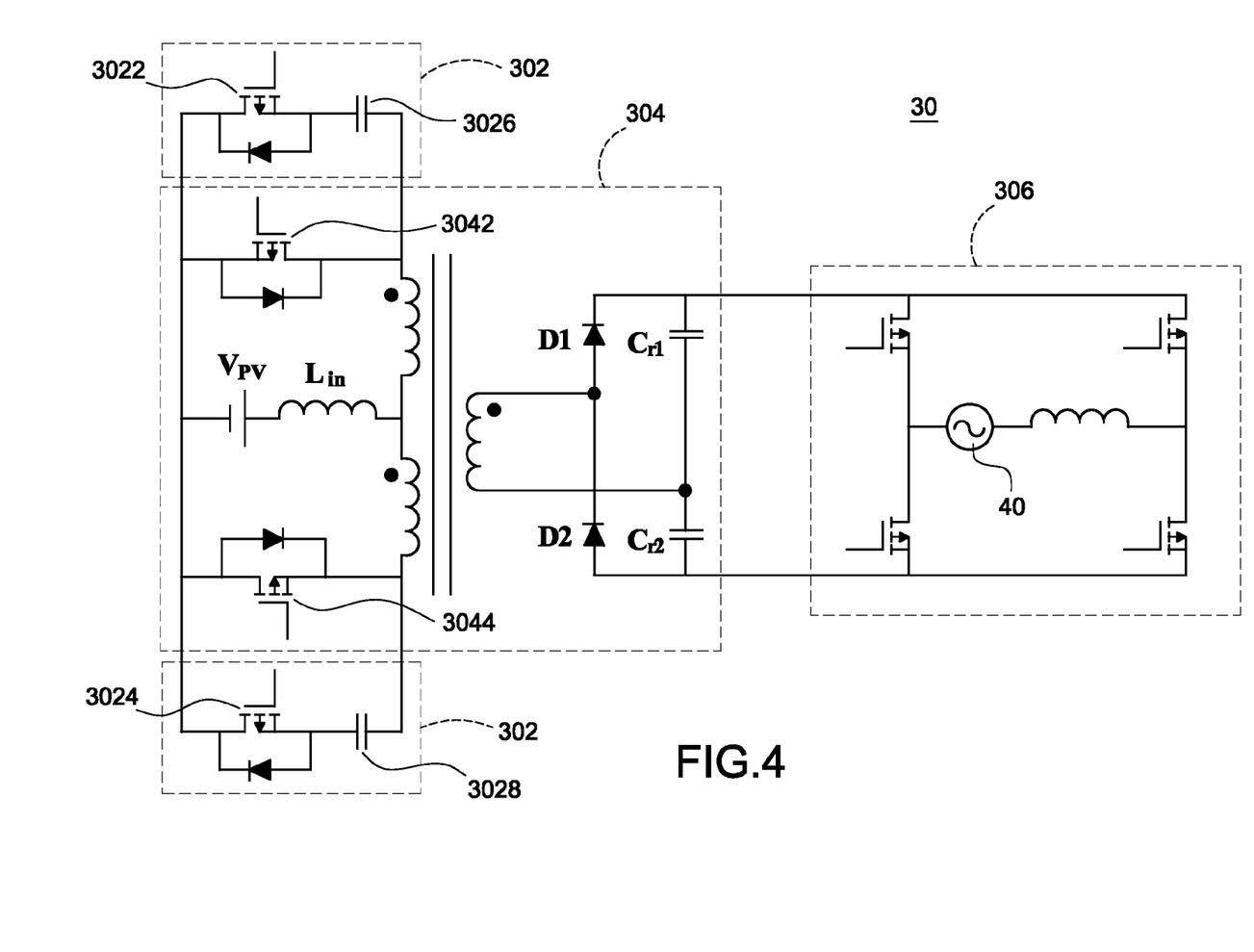
FIG. 4 is a circuit diagram of the active-clamping circuit of the AC module according to a second embodiment of the present invention.
Figure 5:
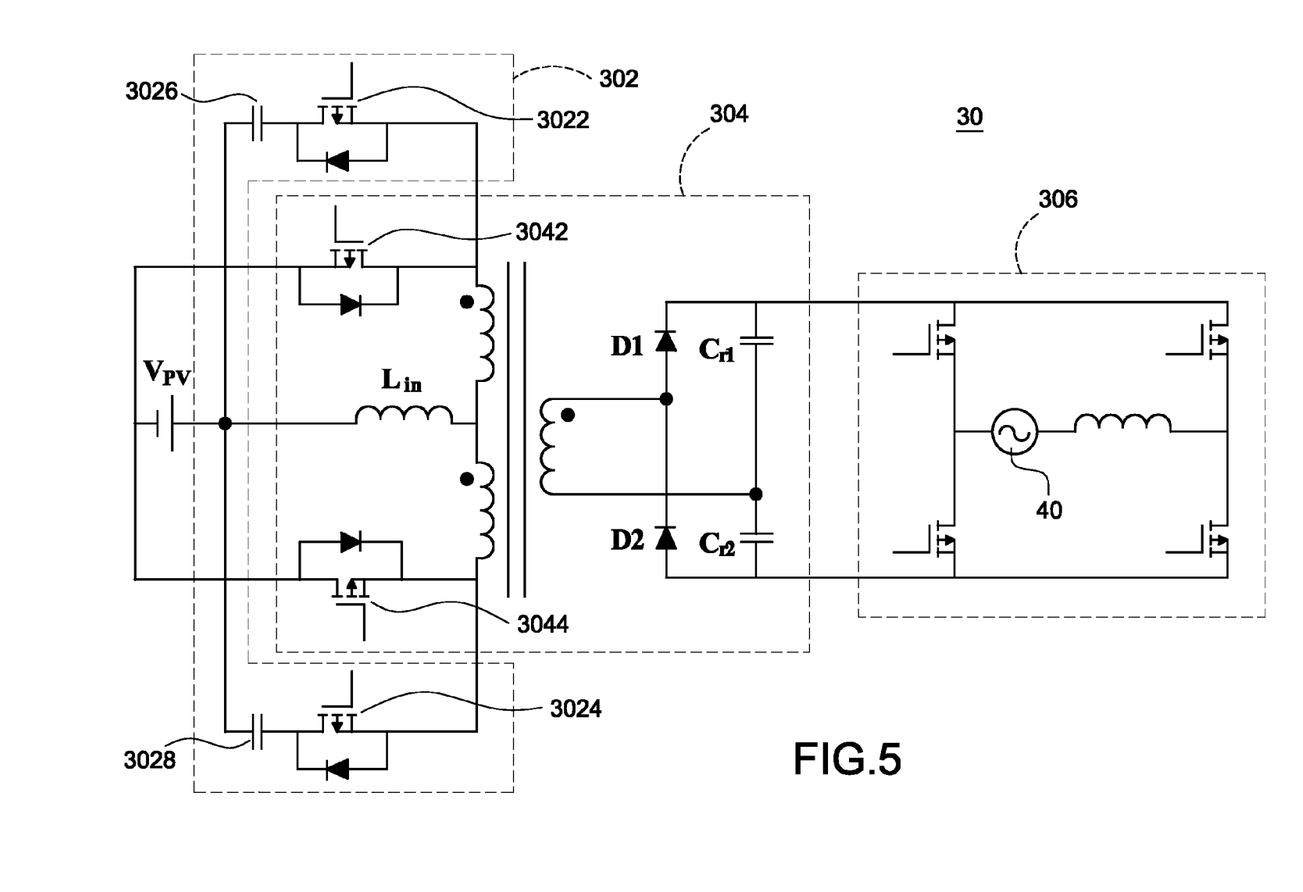
FIG. 5 is a circuit diagram of the active-clamping circuit of the AC module according to a third embodiment of the present invention.
Figure 6:
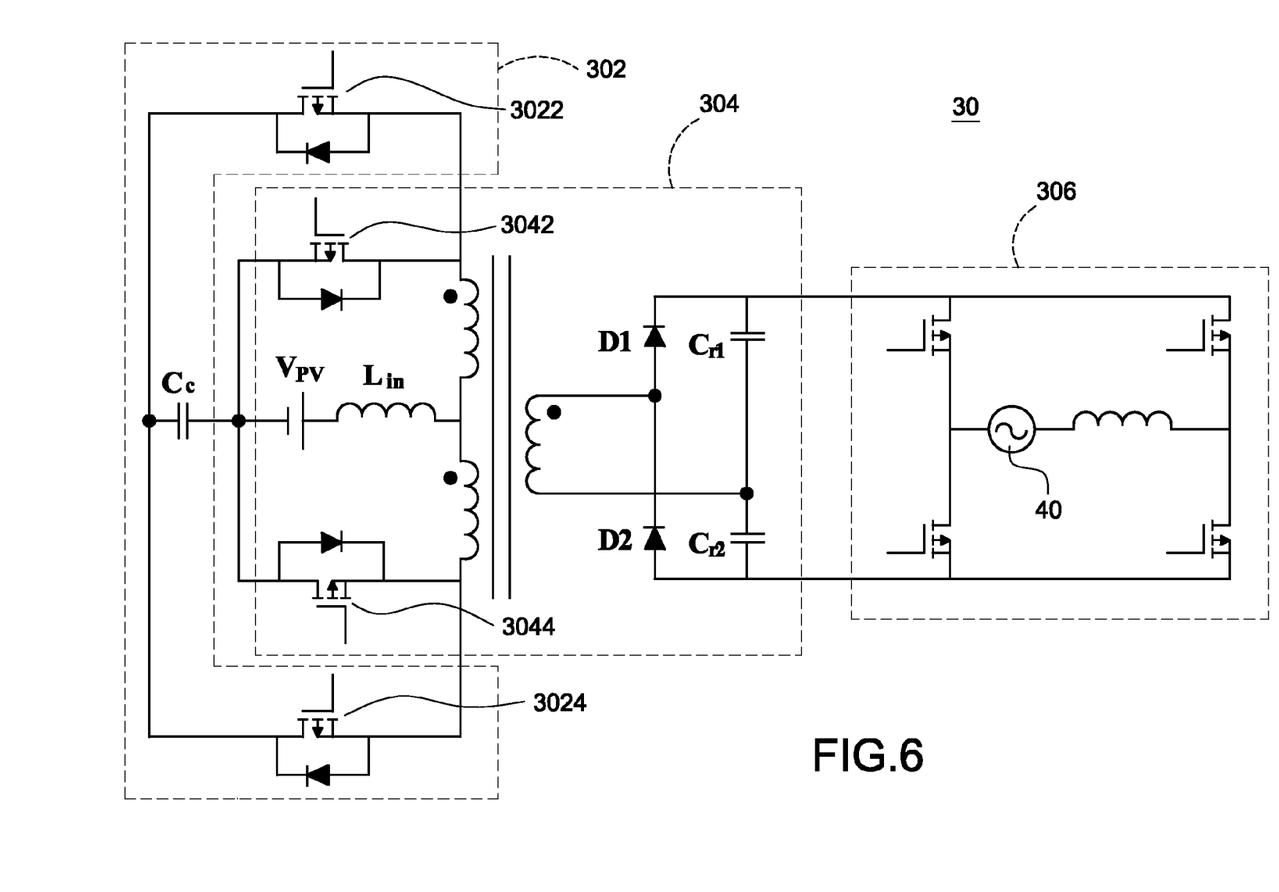
FIG. 6 is a circuit diagram of the active-clamping circuit of the AC module according to a fourth embodiment of the present invention.

Furthermore, the active-clamping circuit 302 of the photovoltaic powered system could provide various embodiments according to different circuit designs. Reference is made to FIG. 4, FIG. 5, and FIG. 6 which are a circuit diagram of the active-clamping circuit of the AC module according to a second embodiment, a third embodiment, a fourth embodiment of the present invention, respectively. In particular, the major difference between the second embodiment and the first embodiment (and between the third embodiment and the first embodiment) is that the connection structure of the first clamping switch 3022, the second clamping switch 3024, the first clamping capacitor 3026, and the second clamping capacitor 3028, but the rest is the same. In addition, in the fourth embodiment, the first clamping switch 3022 and the second clamping switch 3024 are integrated with a clamping capacitor Cc. However, the difference between the fourth embodiment and the first embodiment is the integrated clamping capacitor Cc, but the rest is the same. Hence, the detail description is omitted here for conciseness.

Figure 7:
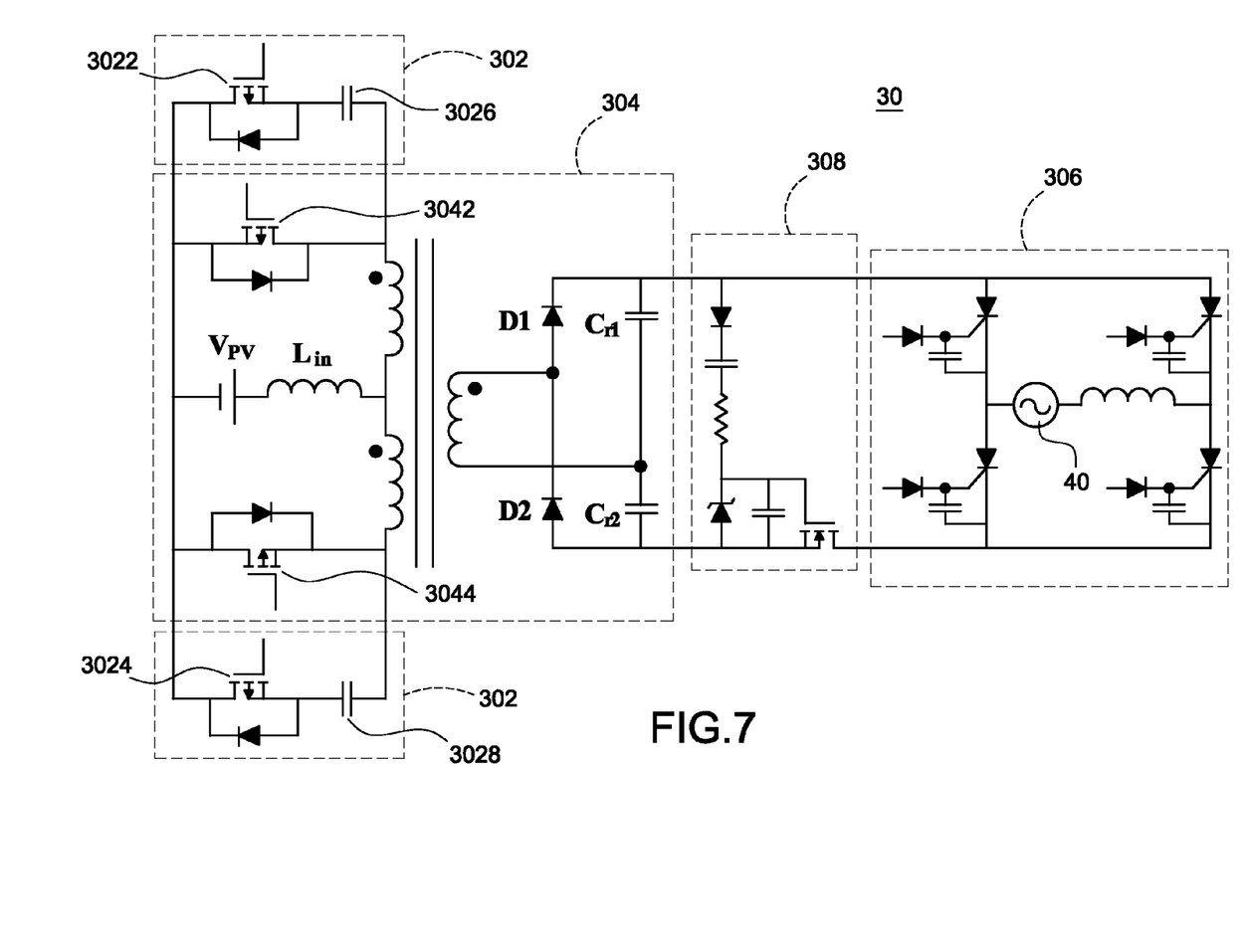
FIG. 7 is a circuit diagram of the AC module according to another embodiment of the present invention.

Beside of the active-clamping circuit 302, the AC module 30 further has different embodiments. Reference is made to FIG. 7 which is a circuit diagram of the AC module according to another embodiment of the present invention, and the AC module 30 shown in FIG. 4 is exemplified for further demonstration. Beside of the active-clamping circuit 302, the power converter 304, and the AC selection switch circuit 306, the AC module 30 further includes a protection circuit 308. The protection circuit 308 is electrically connected between the power converter 304 and the AC selection switch circuit 306. In particular, the protection circuit 308 as shown in FIG. 7 can be applied to the above-mentioned different embodiments of the AC module 30. However, this example is for demonstration and not for limitation of the present invention. The protection circuit 308 mainly has a capacitor, an in-series resistor (not labeled), a Zener diode, and an auxiliary power switch (not labeled). The auxiliary power switch has a characteristic of low conduction voltage. Hence, the auxiliary power switch is turned on to maintain the on-state of the power switches of the AC selection switch circuit 306 when the output voltage, which is detected by the protection circuit 308, of the power converter 304 is a low voltage or a zero-voltage crossing. In particular, the power switches of the AC selection switch circuit 306 are silicon controlled rectifiers, SCRs.

In conclusion, the present invention has following advantages:

1. The circuits of the present invention have the self-protection functions, such as isolated function, self current-limiting function, and so on;

2. The zero-voltage soft-switching is realized through the primary-side switches and the active-clamping technology and the rectifying operation is realized through the secondary-side rectifying circuit; and the line-frequency switching circuit provides a line-frequency operation, thus increasing the conversion efficiency of the photovoltaic powered system;

3. Because the active-clamping technology is used, the duty cycle of power switches of the converter need not to be limited to be larger than 50%, like the conventional current-fed push-pull, and the voltage-double technology is adopted to boost the voltage level of the output voltage of the photovoltaic module to coordinate that of AC utility power, thus providing a current-fed grid-connection to the AC utility power. Hence, the AC module of the present invention is suitable for the middle/small power photovoltaic module with a wide range and low input voltage;

4. In general, the use life of the power converter is depended on the electrolytic capacitors thereof and the operation temperature. Because the electrolytic capacitors are not used but small-capacity film capacitors are used for filtering out high-frequency harmonic components, converting energy, and boosting voltage, the use life of the power converter can be significantly increased;

5. The voltage-doubling rectifying is operated in the high-voltage side to boost the voltage level of the secondary output voltage without the large turn ratio of the transformer. Hence, the leakage inductance and switch voltage stress can be significantly reduced. Furthermore, the power switches of the circuits have the soft-switching characteristic to increase the use life and raise the reliability of the circuits; and 6. The auxiliary power switch with a low conduction voltage of the protection circuit is turned on to maintain the on-state of the power switches of the AC selection switch circuit when the output voltage, which is detected by the protection circuit 308, of the power converter is a low voltage or a zero-voltage crossing.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A photovoltaic powered system providing a direct current (DC) power through a photovoltaic module and converting the DC power into an alternating current (AC) power grid-connected to an AC utility power; the photovoltaic powered system comprising:
a coupling capacitance unit electrically connected to the photovoltaic module to filter the DC power outputted from the photovoltaic module; and
an AC module electrically connected to the coupling capacitance unit to convert the filtered DC power into a quasi-sinusoidal current; the AC module comprising:
an active-clamping circuit having a first clamping switch, a second clamping switch, a first clamping capacitor, and a second clamping capacitor, the active-clamping circuit receiving the filtered DC power and reducing voltage spike of the filtered DC power; wherein the first clamping switch is connected in series to the first clamping capacitor to form a first clamping switch-capacitor assembly; the second clamping switch is connected in series to the second clamping capacitor to form a second clamping switch-capacitor assembly;
a power converter electrically connected to the active-clamping circuit and having comprising:
an isolated transformer having a first primary side, a second primary side, and a secondary side;
a first main switch connected to the first primary side and a second main switch connected to the second primary side; wherein the first main switch is connected in parallel to the first clamping switch-capacitor assembly and the second main switch is connected in parallel to the second clamping switch-capacitor assembly; and
a rectifying circuit having two diodes and two filter capacitors; wherein the two diodes and the two filter capacitors are connected to the secondary side; thus receiving the DC power, converting the voltage level of the DC power, and rectifying the DC power; and
an AC selection switch circuit electrically connected to the power converter and the AC utility power and having a plurality of power switches forming a full-bridge switch circuit to provide a synchronous switching to the AC utility power;
whereby the quasi-sinusoidal current is converted into a sinusoidal current and high-frequency harmonic components of the sinusoidal current are filtered to produce a sinusoidal output current in phase with the AC utility power, thus realizing the maximum power point tracking (MPPT) of the photovoltaic module and feeding unity-power-factor power into the AC utility power.

2. The photovoltaic powered system in claim 1, further comprising:

a line-frequency switching circuit electrically connected to the AC module to receive the voltage and current outputted from the AC module, thus producing driving signals for driving the power switches of the AC selection switch circuit;

a voltage/current detecting circuit electrically connected to the photovoltaic module and the coupling capacitance unit to detect the DC output voltage and the DC output current outputted from the photovoltaic module and produce driving signals for driving the first clamping switch and the second clamping switch of the active-clamping circuit and the first main switch and the second main switch of the power converter;

a maximum power point tracking controller electrically connected to the AC module and the voltage/current detecting circuit to control the voltage/current detecting circuit by feeding back the output power of the AC module and adjust the voltage and current operation points of the photovoltaic module to provide the MPPT; and a driving circuit electrically connected to the voltage/current detecting circuit, the line-frequency switching circuit, and the AC module to receive the driving signals produced from the voltage/current detecting circuit and the line-frequency switching circuit, respectively, and to drive the active-clamping circuit and the AC selection switch circuit.

3. The photovoltaic powered system in claim 1, wherein the AC module further comprises a protection circuit electrically connected between the power converter and the AC selection switch circuit to maintain turning on the power switches of the AC selection switch circuit when the output voltage of the power converter is at low voltage or zero-voltage crossing.

4. The photovoltaic powered system in claim 1, wherein the first clamping switch of the active-clamping circuit and the first main switch of the power converter are driven by complementary-level driving signals, and the second clamping switch of the active-clamping circuit and the second main switch of the power converter are driven the complementary-level driving signals.

5. The photovoltaic powered system in claim 1, wherein a phase difference between the first main switch and the second main switch of the power converter is 180 degrees.

6. The photovoltaic powered system in claim 1, wherein each of the clamping switches of the active-clamping circuit and each of the main switches of power converter implement the soft-switching operation with a dead time.

7. The photovoltaic powered system in claim 1, wherein the power converter is a current-fed push-pull converter.

8. The photovoltaic powered system in claim 1, wherein the power switches of the AC selection switch circuit are metal-oxide-semiconductor field effect transistors (MOSFETs).

9. The photovoltaic powered system in claim 1, wherein the power switches of the AC selection switch circuit are silicon controlled rectifiers (SCRs).

10. The photovoltaic powered system in claim 1, wherein the isolated transformer of the power converter has a primary side with a center tap and a secondary side with a voltage-doubling rectifying to boost the voltage level of the output voltage of the photovoltaic module to coordinate that of the AC utility power, thus providing a current-fed grid-connection to the AC utility power.

11. An alternating current (AC) module of a photovoltaic powered system receiving a direct current (DC) power and converting the DC power into an AC power grid-connected to an AC utility power; the AC module comprising:

an active-clamping circuit having a first clamping switch, a second clamping switch, a first clamping capacitor, and a second clamping capacitor, the active-clamping circuit receiving the filtered DC power and reducing voltage spike of the filtered DC power; wherein the first clamping switch is connected in series to the first clamping capacitor to form a first clamping switch-capacitor assembly; the second clamping switch is connected in series to the second clamping capacitor to form a second clamping switch-capacitor assembly;

a power converter electrically connected to the active-clamping circuit and having comprising:
an isolated transformer having a first primary side, a second primary side, and a secondary side;
a first main switch connected to the first primary side and a second main switch connected to the second primary side; wherein the first main switch is connected in parallel to the first clamping switch-capacitor assembly and the second main switch is connected in parallel to the second clamping switch-capacitor assembly; and
a rectifying circuit having two diodes and two filter capacitors; wherein the two diodes and the two filter capacitors are connected to the secondary side; thus receiving the DC power, converting the voltage level of the DC power, and rectifying the DC power; and an AC selection switch circuit electrically connected to the power converter and the AC utility power and having a plurality of power switches forming a full-bridge switch circuit to provide a synchronous switching to the AC utility power;

whereby the quasi-sinusoidal current is converted into a sinusoidal current and high-frequency harmonic components of the sinusoidal current are filtered to produce a sinusoidal output current in phase with the AC utility power, thus realizing the maximum power point tracking (MPPT) of the photovoltaic module and feeding unity-power-factor power into the AC utility power.

12. The photovoltaic powered system in claim 11, wherein the AC module further comprises a protection circuit electrically connected between the power converter and the AC selection switch circuit to maintain turning on the power switches of the AC selection switch circuit when the output voltage of the power converter is at low voltage or zero-voltage crossing.

13. The photovoltaic powered system in claim 11, wherein the first clamping switch of the active-clamping circuit and the first main switch of the power converter are driven by complementary-level driving signals, and the second clamping switch of the active-clamping circuit and the second main switch of the power converter are driven the complementary-level driving signals.

14. The photovoltaic powered system in claim 11, wherein a phase difference between the first main switch and the second main switch of the power converter is 180 degrees.

15. The photovoltaic powered system in claim 11, wherein each of the clamping switches of the active-clamping circuit and each of the main switches of power converter implement the soft-switching operation with a dead time.

16. The photovoltaic powered system in claim 11, wherein the power converter is a current-fed push-pull converter.

17. The photovoltaic powered system in claim 11, wherein the power switches of the AC selection switch circuit are metal-oxide-semiconductor field effect transistors (MOSFETs).

18. The photovoltaic powered system in claim 11, wherein the power switches of the AC selection switch circuit are silicon controlled rectifiers (SCRs).

19. The photovoltaic powered system in claim 11, wherein the isolated transformer of the power converter has a primary side with a center tap and a secondary side with a voltage-doubling rectifying to boost the voltage level of the output voltage of the photovoltaic module to coordinate that of the AC utility power, thus providing a current-fed grid-connection to the AC utility power.

* * * * *